United States Patent Office 3,488,304
Patented Jan. 6, 1970

3,488,304
INTERPOLYMERS CONTAINING ORGANOPOLY-SILOXANES AND COATING COMPOSITIONS MADE THEREFROM
Robert A. Baugh, Gibsonia, and John S. Ostrowski, Pittsburgh, Pa., assignors to PPG Industries, Inc., a corporation of Pennsylvania
No Drawing. Filed June 19, 1967, Ser. No. 647,196
Int. Cl. C08f 21/04
U.S. Cl. 260—22
15 Claims

ABSTRACT OF THE DISCLOSURE

Interpolymers useful in coating compositions are made by the interpolymerization of an alkyd resin or the components thereof, an organopolysiloxane, a functional compound reactive with the organopolysiloxane, and one or more ethylenically unsaturated monomers. Oil or fatty acid modified alkyds, which provide excellent air-drying coating compositions are preferred. The product is considered as a copolymer of the alkyd resin and the polymerized ethylenic monomers coupled through the organopolysiloxane. Coatings produced from these interpolymers are fast drying, have high gloss and have excellent durability.

Various coating compositions have been known which are based on alkyd resins or modified-alkyd resins in which the alkyd is copolymerized with acrylic or other vinyl monomers, or with organosilicon compounds. However, such products have been subject to numerous disadvantages including insufficient compatibility, difficulties in application, the requirement for high curing temperatures and, in many cases, unsatisfactory final properties in coatings made from the composition.

The present invention provides interpolymers suitable as the vehicle resin for coating compositions having a unique and highly desirable combination of properties. For example, coatings made from these compositions are of high gloss, are fast drying, have good resistance to weathering and high humidity conditions, and have generally outstanding durability. In many preferred embodiments of the invention, the coatings provided are curable without the necessity for elevated temperatures and become tack-free in a relatively short time, thereby permitting ease of handling during commercial operations. The coatings obtained are clear and glossy, thus indicating a high degree of compatibility of the components.

The products herein comprise the interpolymer formed by the interreaction of several components. These components include (a) An alkyd resin or the components of an alkyd resin, i.e. polyol, polycarboxylic acid, and any other desired constituents, such as oil or oil acids;

(b) One or more organopolysiloxanes which contain groups reactive with hydroxyl functional groups;

(c) At least one functional compound containing a polymerizable ethylenic group and a functional group reactive with the organopolysiloxane; and (d) One or more other ethylenically unsaturated monomers.

The components of the interpolymer can be interreacted in essentially any order, provided that the organopolysiloxane is reacted with the alkyd resin or the polyol employed to produce the alkyd and also is coreacted with the reactive ethylenic compound. The other monomers are polymerized with each other and with the reactive compound through their ethylenic linkages, generally in a free radical-initiated polymerization reaction.

In the ordinary practice of the invention, all or part of the organopolysiloxane component is coreacted with the alkyd during the preparation of the alkyd. Using ordinary conditions of reaction employed in making alkyd resin, the organopolysiloxane reacts with the hydroxyl groups available in the alkyd resin or the reaction mixture used in preparing it, but retains sufficient functionality to provide further reaction sites. The organopolysiloxane-modified alkyd resin product is then reacted with the monomer or polymer molecule containing the reactive functional groups from the reactive monomer as described below. This further reaction is generally carried out simultaneously with the addition copolymerization of the ethylenic monomer, using conditions at which free-radical initiated copolymerizations take place, although the ethylenic monomers can be copolymerized prior to or after the other reaction. In any event, the product essentially is an alkyd resin-vinyl monomer copolymer coupled through the organopolysiloxane.

The alkyd resin employed in the invention can be essentially any of the well-known alkyds that can be employed in coatings applications. Such alkyds are made from the reaction of one or more polycarboxylic acids with one or more polyols using varying ratios and reaction conditions depending upon the specific reactants and the use to which the product is to be put. The alkyd can be non-oil modified, but preferably oil or fatty acid modified alkyds are employed. Such modified alkyds provide air-drying coating compositions, i.e. compositions which dry at ordinary ambient conditions without the necessity for baking at elevated temperatures.

It may be noted that it is not necessary to provide conjugated ethylenic groups or similar sites for addition reactions in the alkyd (although such sites can be present). This is because the addition polymerization reaction with the monomers does not require this type of coreaction with the alkyd. This is in contrast to the usual type of alkyd copolymers, particularly using acrylic monomers, where in order to obtain a compatible product the monomers must be copolymerized with the alkyd itself by an addition polymerization reaction.

It is preferred that the alkyd be made using at least in part a polyol having three or more hydroxyl groups since the use of such polyols provide alkyds having hydroxyl groups pendent on the polymer chain, thus providing readily accessible site for reaction with the organopolysiloxane. Pentaerythritol is a specific preferred polyol for use in making alkyds to be employed herein, but other polyols having, for example, 2 to 12 carbon atoms can also be used. These include such polyols as glycerol, ethylene glycol, diethylene glycol, 1,2,6-hexanetriol, trimethylolpropane, dipentaerythritol, sorbitol, mannitol, and others. These are reacted with polycarboxylic acids (or their anhydrides) such as adipic acid, succinic acid, maleic acid, fumaric acid, phthalic acid, isophthalic acid, tetrachlorophthalic acid, trimellitic acid, and similar acids, preferably having up to about 12 carbon atoms. The alkyd may also contain some unsaturated acids and/or monobasic acids, if desired, such as crotonic acid, sorbic acid, maleic acid, benzoic acid, etc., as well as minor amounts of other reative modifiers, such as allyl alcohol.

In the preferred embodiments of the invention, the alkyd is modified with an oil or oil acid. There can be utilized for this purpose any of the drying or semi-drying oils or fatty acids, such as linseed oil, tung oil, soya oil, dehydrated castor oil, or the like, or their corresponding fatty acids. Dimer acids, such as dimerized linoleic acid, can be included, as can non-drying oils or fatty acids, although these do not impart air-drying characteristics to the product. The proportions of reactants used in making the alkyd are those commonly utilized to provide a product of the desired hydroxyl number; when oil is included the amount of oil employed is from about 20 percent to about 75 percent, preferably about 60 percent, based on the total weight of alkyd.

The alkyd is made using conventional techniques, provided only that the reaction with the organopolysiloxane is carried out either simultaneously with the preparation of the alkyd or after the reaction is partially or wholly completed. When the reaction with the alkyd is completed prior to introduction of the organopolysiloxane, care should be taken to provide some functionality in the alkyd, this ordinarily being accomplished by using proportions of reactants and reaction conditions so as to provide an alkyd having a hydroxyl number of about 40 or more (based on 100 percent resin solids).

The organopolysiloxane employed is an organopolysiloxane resin which is reactive with hydroxyl or similar functional groups. Such organosiloxane resins are well known in the art; those which are typically employed in this invention conform to the general unit formula:

$$R_nSi(OR')_mO_{\frac{4-n-m}{2}}$$

where R is a monovalent organic radical bonded to silicon by a carbon-to-silicon bond and R' is hydrgen, an alkyl radical, an aryl radical, or an acyl radical. The value of $n$ in the above formula is between about 0.5 and 1.9 and the value of $m$ between 0.01 and 2.5; the value of $m$ plus $n$ must be between 0.51 and 3.

The substituents represented by R in the above formula include, for example, monovalent hydrocarbon radicals such as methyl, ethyl, propyl, hexyl, octadecyl and similar alkyl radicals; monovalent cycloaliphatic radicals such as cyclohexyl and cyclopentyl; aryl radicals, for example, phenyl, methylphenyl, benzyl, and the like; alkenyl, for instance, vinyl, allyl, 3-butenyl, and linoleyl; cycloalkenyl radicals such as cyclopentadienyl; and alkenylaryl groups such as the vinyl phenyl radical. R may also be a substituted hydrocarbon radical, for example, a halo-substituted organic radical such as pentachlorophenyl, 1-bromo-3-trifluoropropyl, and delta - trifluoro-gamma-difluorobutyl, or it may be an amino-substituted hydrocarbon group such as aminoethyl, 3-aminopropyl, and the like. Other substituted hydrocarbon radicals which may be included within the scope of the R substituent are cyano-substituted hydrocarbon radicals such as 3-cyanopropyl, carboxyl-substituted radicals such as 3-carboxylpropyl, and sulfur-substituted radicals, including 3-mercaptopropyl, ethyl thioethyl, and ethyl sulfonylpropyl, as well as hydroxy-substituted radicals, such as hydroxypropyl.

The groups represented by R' include hydrogen and alkyl groups of 1 to 20 carbon atoms, such as methyl, ethyl, propyl, butyl, amyl, hexyl, heptyl and octyl. R' may also be an aryl radical such as phenyl, tolyl or halogen or other substituted phenyl, or an acyl radical such as acetyl, propionyl, butyryl or other similar acyl radicals, generally having between 1 and 8 carbon atoms.

Examples of organosiloxane resins and methods of producing them can be found in various publications as well as in patents such as U.S. Patents 2,258,218; 2,358,-219; 2,258,222; 2,371,050; 2,389,477; 2,584,341; 2,663,-694; 2,746,942; 2,768,149; and 3,015,637.

The preferred organosiloxane resins are those now commercially available which usually contain phenyl and/or methyl substitution.

The functional compound employed can be any compound containing a polymerizable ethylenic group along with a functional group reactive with the organopolysiloxane. Such functional groups include, for instance, hydroxyl groups, carboxyl groups, amino groups, and similar groups, although the nature of the particular organopolysiloxane determines the type of functional monomer to be utilized. The preferred functional compounds are hydroxyl-containing ethylenic monomers, such as hydroxyalkyl esters of ethylenically unsaturated carboxylic acids. Particularly preferred are hydroxyalkyl esters of acrylic acid and methacrylic acid, such as 2-hydroxypropyl acrylate, 2 - hydroxypropyl methacrylate, 2-hydroxyethyl acrylate, 2 - hydroxyethyl methacrylate, 3-hydroxypropyl acrylate, 3 - hydroxypropyl methacrylate, 4-hydroxybutyl acrylate, 2 - 3 - dihydroxypropyl acrylate, 6,10 - dihydroxydecyl methacrylate, and other hydroxyalkyl acrylates and methacrylates in which the hydroxyalkyl group contains up to about 12 carbon atoms.

There may also be employed similar esters of other unsaturated acids, for example, those having up to about 6 carbon atoms, such as crotonic acid. Hydroxyl-containing esters of unsaturated dicarboxylic acids, can also be used, such as esters such as maleic acid, fumaric acid, and itaconic acid. These may be mono- or diesters and one or both of the esterifying groups can be a hydroxyalkyl group. Examples of such esters include 2-hydroxypropyl hydrogen maleate, bis(2-hydroxyethyl) maleate, 2-hydroxyethyl hydrogen fumarate, and 2-hydroxyethyl methyl maleate. In addition to hydroxyl esters of unsaturated acids, other reactive monomers can be utilized in certain instances, including, for example, allyl alcohol, aminoethyl acrylate, etc.

One or more other copolymerizable ethylenic monomers are also included in the interpolymers herein. Essentially any such monomer can be utilized and many and varied types of monomers can be employed to impart particular characteristics to the interpolymer and coatings made therefrom. Combinations of acrylic monomers, i.e., derivatives of acrylic acid or methacrylic acid, and vinyl aromatic hydrocarbons, such as styrene, are preferred for most purposes. Among the preferred monomers are alkyl acrylates and methacrylates including ethyl, methyl, propyl, butyl, hexyl, ethylhexyl and lauryl acrylates and methacrylates, as well as other similar esters having up to about 20 carbon atoms in the alkyl group. Acrylic acid and methacrylic acid themselves may also be employed, as can acrylonitrile and methacrylonitrile. Vinyl aromatic hydrocarbons that can be employed in addition to styrene include vinyl toluene and alpha-alkyl styrenes such as alpha-methyl styrene.

In addition to the above preferred monomers, various other polymerizable monomers can be utilized if desired, including unsaturated monocarboxylic and polycarboxylic acids, such as crotonic acid, methyl hydrogen maleate, butyl hydrogen fumarate, maleic acid, itaconic acid and fumaric acid as well as the anhydrides of those acids which form anhydrides. There may also be employed other olefinic hydrocarbons, such as isobutylene, 1,3-butadiene and the like; halogenated olefinic hydrocarbons such as alpha-chlorosytrene, 2-chloropropylene and 2,3-dichloro-1,2-butadiene; and other unsaturated esters, such as vinyl acetate, vinyl propionate, vinyl butyrate, methyl crotonate, dimethyl maleate, dibutyl fumarate, allyl chloride and others.

The proportions of the components are not critical and can be varied widely, depending upon the characteristics desired in the product and the specific reactants employed. Ordinarily, however, based upon the total weight of the alkyd resin or alkyd resin components and the organopolysilioxane and interpolymerized monomers, the interpolymer is comprised of from about 10 percent to about 50 percent of alkyd resin or the components thereof, from about 5 percent to about 50 percent of organopolysiloxane, from about 1 percent to about 15 percent of functional compound, and from about 30 percent to about 70 percent of other monomer or monomers.

As indicated above, the preparation of the alkyd resin is carried out using conventional techniques, and such conventional practice is also employed when the organopolysiloxane is included in the alkyd resin reaction mixture. For example, reaction temperatures of 380° F. to 500° F. are typically employed, and usual catalysts and solvents are utilized. When the organopolysiloxane is reacted with a preformed alkyd resin, this reaction is carried out by heating the reactants to temperatures of about 230° F. to 450° F. while removing any evolved water or alcohol. A catalyst such as an organic titanate, e.g., tetraisopropyl titanate, can be employed if desired.

The reaction of the organopolysiloxane-modified alkyd resin or of the organopolysiloxane itself with the functional compound can be carried out prior to the interpolymerization reaction with the other ethylenic monomers, and when this is done, it is accomplished by heating the reactants to temperatures of about 230° F. to about 350° F. A catalyst is not necessary but one may be employed if desired. The addition polymerization of the other monomers is then carried out in the presence of the organopolysiloxane product, thereby effecting coreaction. Certain organopolysiloxanes containing unsaturated linkages are commercially available and can be employed in this manner.

Alternatively, the reaction with the organopolysiloxane is carried out concurrently with the addition polymerization reaction. In this case, as also when the organopolysiloxane or organosiloxane-modified alkyd is prereacted with the functional monomer, the vinyl polymerization is carried out under the usual conditions at which free radical-initiated addition polymerization reaction takes place. Ordinarily a free radical catalyst, such as benzoyl peroxide, cumene hydroperoxide, alpha-alpha'-azobis-(isobutyronitrile), tertiarylbutylperoxy isopropyl carbonate or the like, is utilized along with sufficiently elevated temperatures to provide free radicals at an appreciable rate. The choice of catalyst and reaction conditions is usually made depending upon the particular monomers employed in accordance with the conventional practice for the polymerization of such monomers.

One preferred type of interpolymer as described herein is made by reacting part of the organopolysiloxane with the alkyd during the preparation of the alkyd, and then including additional organopolysiloxane with the ethylenic monomers. Better control of viscosity and other properties can be obtained in this manner, particularly by utilizing different organopolysiloxanes of varying reactivity.

As indicated above, the interpolymers produced in accordance with the invention are especially useful in coating compositions and in many embodiments provide coatings which can be dried at ambient temperatures. When employed for coatings, these interpolymers can be utilized as the vehicle resin in clear finishes, in which case the interpolymer is simply applied from a solution of suitable viscosity and allowed to dry at ambient temperatures or baked at elevated temperatures to provide a clear, hard, glossy film. Usually, however, they are utilized as the sole or major film-forming component of pigmented coating compositions. Such compositions can be used for various protective and decorative purposes for coating on wood, metal and other substrates. The air-drying compositions of the invention can be utilized as the vehicle resin in clear finishes, in which case the interpolymer is simply applied from a solution of suitable viscosity and allowed to dry at ambient temperatures or baked at elevated temperatures to provide a clear, hard, glossy film. Usually, however, they are utilized as the sole or major film-forming component of pigmented coating compositions. Such compositions can be used for various protective and decorative purposes for coating on wood, metal and other substrates. The air-drying compositions of the invention can be employed as automotive refinish paints and for similar applications wherein their combination of outstanding properties, including exceptional durability, provide an advantage over presently available coating compositions.

Coating compositions containing the interpolymers of the invention can be pigmented with any of the various conventional pigments employed in coatings for automotive and industrial use, including metallic pigments such as aluminum flake, which provide metallic finishes, and various color pigments to provide finishes of various colors. Suitable solvents, fillers, driers, additives and the like are also incorporated in the coating composition if desired, and the compositions are applied to the substrate by various conventional techniques. These compositions can be particularly adapted to application by spraying because coating compositions of relatively high solids content have suitable viscosity.

Set forth below are several examples of the method and practice of the invention. These are set forth as illustrative of the invention and are not to be construed as limitations thereon. All parts and percentages in the examples as well as throughout the specification are based on non-volatile solids content and are by weight unless otherwise indicated.

EXAMPLE 1

An organopolysiloxane-modified alkyd was produced from the following:

| | Parts by weight |
|---|---|
| Safflower fatty acids | 1204 |
| Phthalic anhydride | 394 |
| Pentaerythritol | 558 |
| Dibutyl tin oxide | 5 |
| Xylene | 120 |

This mixture was charged into a kettle equipped with agitator, inert gas feed, trap and condenser and cooked at 340° F. to 410° F. until the product had an acid value of about 10. There were then added 1148 parts of organopolysiloxane and 2.75 parts of tetraisopropyl titanate. The organopolysiloxane (Dow-Corning Z-6188) was a methyl, phenyl, and methoxy substituted polysiloxane believed made by condensing dimethyltriphenyltrimethoxytrisiloxane. It has a methoxy content of 15 percent, an average molecular weight of 621, an equivalent weight of 206 and a total solids content of 100 percent. After distilling this mixture for 2 hours to remove evolved methanol, there were added 1276 parts of xylene. The product had the following properties:

| | |
|---|---|
| Total non-volatile solids percent | 69.2 |
| Viscosity (Gardner-Holdt) | L–M |
| Acid number | 3.15 |
| Hydroxyl number | 45.3 |

This product was then further reacted by mixing the following:

| | Parts by weight |
|---|---|
| Modified alkyd from above (69 percent solids) | 1040 |
| Styrene | 230 |
| Methyl methacrylate | 736 |
| 2-hydroxyethyl methacrylate | 40 |
| 2-ethylhexyl acrylate | 74 |
| Xylene | 600 |
| Benzoyl peroxide | 13.5 |
| Tetraisopropyl titanate | 1.0 |

This mixture was heated to reflux for 30 minutes and then 2.7 parts of benzoyl peroxide in 40 parts of xylene were added. Heating was continued for 8 hours with similar catalyst solutions being added after each of the first 7 hours (total catalyst 32.4 parts). The product was then sparged with inert gas to remove unreacted monomers, and cooled, and sufficient xylene added to make the total non-volatile solids content 54.8 percent. The product had a Gardner-Holdt viscosity of Z and an acid number of 1.8.

The excellent properties of this product were shown by formulating an air-drying blue polychromatic enamel using the above product as the vehicle with aluminum flake and phthalocyanine blue pigments. The enamel contained 50 percent total solids of which 2.5 percent was pigment and 97.5 percent was resin. This enamel was sprayed as a 2 mil film (dry film thickness) over a conventional primer-surfacer used in refinishing automobiles (nitrocellulose-alkyd vehicle), and allowed to air-dry.

The coating was tack-free in 60 minutes and had excellent overall properties, including good appearance and color and high gloss.

EXAMPLE 2

Following the procedure of Example 1, a similar modified alkyd was made having the following properties:

| | |
|---|---|
| Total non-volatile solids _____percent__ | 70.6 |
| Acid number _____ | 3.44 |
| Hydroxyl number _____ | 38.7 |
| Viscosity (Gardner-Holdt) _____ | M–N |

This product was then used in making an interpolymer with the following:

| | Parts by weight |
|---|---|
| Product above (70 percent solids) _____ | 1028 |
| Styrene _____ | 180 |
| Methyl methacrylate _____ | 612 |
| 2-hydroxyethyl methacrylate _____ | 36 |
| 2-ethylhexyl acrylate _____ | 72 |
| Organopolysiloxane[1] _____ | 180 |
| Xylene _____ | 612 |
| Benzoyl peroxide _____ | 11.25 |

[1] Phenyl-substituted organopolysiloxane (Dow Corning Z–6018 having an average molecular weight of about 1600, an average of 4 hydroxyl groups per molecule and a unit formula of $R_{1.00}Si(OH)_{0.4}O_{1.3}$.

This mixture was refluxed for 7½ hours with seven hourly additions of 2.25 parts of benzoyl peroxide in 40 parts of xylene. This mixture was then sparged with inert gas, 300 parts of xylene were added and filtered. The product had the following properties:

| | |
|---|---|
| Total non-volatile solids _____ | 55.9 |
| Viscosity (Gardner-Holdt) _____ | W–X |
| Acid number _____ | 2.15 |

This interpolymer was employed as the vehicle in a blue polychromatic enamel as in Example 1. Coatings made therefrom were tack-free in 40 minutes at room temperature and had good properties, including even higher gloss than the coating of Example 1.

EXAMPLE 3

Example 2 was repeated using the following:

| | Parts by weight |
|---|---|
| Modified alkyd (70 percent solids) _____ | 795 |
| Methyl methacrylate _____ | 886 |
| Butyl methacrylate _____ | 230 |
| 2-hydroxyethyl methacrylate _____ | 36 |
| Organopolysiloxane (as in Example 2) _____ | 92 |
| Xylene _____ | 681 |
| Benzoyl peroxide (initial) _____ | 14.5 |
| Benzoyl peroxide (additions) _____ | [2] 2.89 |

[2] Each in 40 parts of xylene.

The product had a solids content of 54.2 percent, a Gardner-Holdt viscosity of Z–2 and an acid number of 1.80. Coatings made from this product had the same excellent properties described above.

EXAMPLE 4

Example 2 was repeated except that the proportion of organopolysiloxane was increased to a total of 35 percent by weight. The following reactants were employed:

| | Parts by weight |
|---|---|
| Modified alkyd (70 percent solids) _____ | 1028 |
| Organopolysiloxane (as in Example 2) _____ | 360 |
| Methyl methacrylate _____ | 540 |
| Butyl methacrylate _____ | 144 |
| 2-hydroxyethyl methacrylate _____ | 36 |
| Xylene _____ | 612 |
| Benzoyl peroxide (initial) _____ | 9.0 |
| Benzoyl peroxide (additions) _____ | [3] 1.8 |

[3] Each in 40 parts of xylene.

This product also had good properties as described above.

Other organopolysiloxanes can be substituted for those in the above examples. For example, there can be used the resin known as Dow-Corning DC–840, which is an organopolysiloxane comprising mono- and di-substituted methyl siloxane units and phenyl siloxane units, or the methyl and phenyl-substituted siloxane known commercially as SR–82 (General Electric), or dimethyltriphenyltrimethoxytrisiloxane, or other such compounds. Also, other procedures can be used to introduce the organopolysiloxane, such as by prereacting it with the functional monomer and then copolymerizing this product.

Similarly, good results are also obtained by using other alkyds of varying types as described hereinabove, in place of those of the foregoing examples. Also, other functional monomers, such as 2-hydroxypropyl acrylate or the other specific monomers mentioned above, can be substituted for those exemplified, and other additional monomers and other polymerization methods as known in the art can be utilized instead of those shown. Further, while the interpolymers of the invention are especially advantageous when used in air-drying finishes, coatings made therefrom can be force-dried or baked if desired.

According to the provisions of the patent statutes, there are described above the invention and what are now considered to be its best embodiments. However, within the scope of the appended claims, it is to be understood that the invention can be practiced otherwise than as specifically described.

What is claimed is:
1. An ungelled, organic solvent-soluble interpolymer formed by the interreaction of
 (A) an alkyd resin or the components thereof,
 (B) an orgnopolysiloxne in which at least part of the organo groups are reactive with hydroxyl groups,
 (C) at least one functional compound containing a polymerizable ethylenic group and a functional group reactive with said organapolysiloxane, and
 (D) one or more other ethylenically unsaturated monomers;
said interpolymer containing said alkyd resin and said ethylenic monomers in polymerized form coupled through said organopolysiloxane.

2. The interpolymer of claim 1 in which said alkyd resin is an oil or fatty acid modified alkyd resin.

3. The interpolymer of claim 1 in which the functional compound contains a hydroxyl group.

4. The interpolymer of claim 3 in which said functional compound is a hydroxyalkyl ester of an ethylenically unsaturated carboxylic acid.

5. The interpolymer of claim 1 in which the other ethylenically unsaturated monomers are selected from the group consisting of alkyl acrylates, alykl methacrylates, and vinyl aromatic hydrocarbons.

6. The interpolymer of claim 1 in which the organopolysiloxane has the unit formula

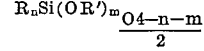

where R is a monovalent organic radical bonded to silicon by a carbon-to-silicon bond; R' is hydrogen, alkyl of 1 to 20 carbon atoms, aryl, or acyl of 1 to 8 carbons; the value of $n$ is between about 0.5 and 1.9; the value of $m$ is between 0.01 and 2.5; and the value of $m$ plus $n$ is between 0.51 and 3.

7. An ungelled, organic solvent-soluble interpolymer formed by the free-radical initiated copolymerization of
 (A) an alkyd resin modified with an organopolysiloxane in which at least part of the organo groups are reactive with hydroxyl groups, and
 (B) a mixture of
  (a) at least one polymerizable ethylenic monomer containing a functional group reactive with said organopolysiloxane, and (b) one or more other polymerizable ethylenically unsaturated monomers;
said interpolymer containing said alkyd resin coupled to a polymeric chain derived from said mixture through said organopolysiloxane.

8. The interpolymer of claim 7 in which said alkyd resin is oil or fatty acid modified.

9. The interpolymer of claim 7, in which said mixture contains additional organopolysiloxane.

10. The interpolymer of claim 9 in which the additional organopolysiloxane is a different organopolysiloxane from that used to modify said alkyd.

11. A coating composition comprising as the vehicle resin thereof the interpolymer of claim 1.

12. An air-drying coating composition comprising as the vehicle resin thereof the interpolymer of claim 7.

13. A method of producing an ungelled, organic-solvent soluble interpolymer which comprises
 (A) reacting an alkyd resin or the components of an alkyd resin with an organopolysiloxane in which at least part of the organo groups are reactive with hydroxyl groups, to produce an organopolysiloxane-modified alkyd resin, and
 (B) reacting said organopolysiloxane-modified alkyd resin under conditions at which free-radical initiated copolymerization reactions take place with a mixture of
  (a) at least one polymerizable ethylenic monomer containing a functional group reactive with said organopolysiloxane, and
  (b) one or more other polymerizable ethylenically unsaturated monomers, whereby there is obtained an ungelled interpolymer containing said alkyd resin and said ethylenically unsaturated monomers in polymerized form coupled through said organopolysiloxane.

14. The method of claim 13 in which said alkyd resin is oil or fatty acid modified.

15. The method of claim 13 in which said mixture contains additional organopolysiloxane.

References Cited

UNITED STATES PATENTS

| | | | |
|---|---|---|---|
| 2,937,230 | 5/1960 | Rogers | 260—22 |
| 3,015,637 | 1/1962 | Rauner et al. | 260—22 |
| 3,075,941 | 1/1963 | Wynstra et al. | 260—33.6 |

FOREIGN PATENTS

| | | |
|---|---|---|
| 235,536 | 3/1959 | Australia. |
| 759,197 | 10/1965 | Great Britain. |
| 762,821 | 12/1956 | Great Britain. |

OTHER REFERENCES

Patton: Alkyd Resin Technology Formulating Techniques and Allied Calculations, Interscience Publishers, 1962, New York, pp. 2, 3, 6 and 7.

DONALD E. CZAJA, Primary Examiner

R. W. GRIFFIN, Assistant Examiner

U.S. Cl. X.R.

260—23, 33.6, 40, 824; 117—132, 148, 161, 167